(12) United States Patent
Takaoka et al.

(10) Patent No.: US 9,550,149 B2
(45) Date of Patent: Jan. 24, 2017

(54) EXHAUST GAS PURIFICATION APPARATUS FOR INTERNAL COMBUSTION ENGINE

(75) Inventors: Kazuya Takaoka, Susono (JP); Toru Kidokoro, Hadano (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 123 days.

(21) Appl. No.: 14/402,830

(22) PCT Filed: May 22, 2012

(86) PCT No.: PCT/JP2012/063050
§ 371 (c)(1),
(2), (4) Date: Nov. 21, 2014

(87) PCT Pub. No.: WO2013/175572
PCT Pub. Date: Nov. 28, 2013

(65) Prior Publication Data
US 2015/0132187 A1   May 14, 2015

(51) Int. Cl.
*B01D 50/00* (2006.01)
*F01N 3/00* (2006.01)
(Continued)

(52) U.S. Cl.
CPC ....... *B01D 53/9495* (2013.01); *B01D 53/9418* (2013.01); *B01D 53/9431* (2013.01); *F01N 3/035* (2013.01); *F01N 3/208* (2013.01); *F01N 3/2066* (2013.01); *F01N 11/00* (2013.01); *F01N 11/002* (2013.01); *F01N 3/103* (2013.01); *F01N 2550/00* (2013.01); *F01N 2550/02* (2013.01); *F01N 2550/04* (2013.01); *F01N 2560/026* (2013.01); *F01N 2560/05* (2013.01);
(Continued)

(58) Field of Classification Search
CPC ...... F01N 11/00; F01N 3/035; F01N 2550/02; F01N 3/103; F01N 2560/06; B01D 53/9431
USPC .................................................. 422/168, 169
See application file for complete search history.

(56) References Cited

U.S. PATENT DOCUMENTS 8,627,645 B2 *  1/2014  Hopka ................... F01N 3/021
                                                            60/274
2006/0086080 A1   4/2006  Katogi et al.
(Continued)

FOREIGN PATENT DOCUMENTS

JP          2000-8840          1/2000
JP          2002-136842        5/2002
(Continued)

*Primary Examiner* — Tom P Duong
(74) *Attorney, Agent, or Firm* — Finnegan, Henderson, Farabow, Garrett & Dunner, LLP (57) ABSTRACT

An exhaust gas purification apparatus for an internal combustion engine is designed to prevent a decrease in the accuracy of measurement by a PM sensor (17). The apparatus includes an NOx catalyst (7) provided in an exhaust passage (3) of an internal combustion engine (1) to reduce NOx by reducing agent supplied to it, a supplying device (6) that supplies urea to the NOx catalyst (7) from the upstream of the NOx catalyst (7), the PM sensor (17) that detects the amount of particulate matter in the exhaust gas in the downstream of the NOx catalyst (7), and a restriction part (10) that restricts supply of urea by the supplying device (6) when the amount of particulate matter adhering to the NOx catalyst (7) is equal to or larger than a threshold.

8 Claims, 6 Drawing Sheets

(51) Int. Cl.
  *B01D 53/94* (2006.01)
  *F01N 3/20* (2006.01)
  *F01N 11/00* (2006.01)
  *F01N 3/035* (2006.01)
  *F01N 3/10* (2006.01)

(52) U.S. Cl.
  CPC ...... *F01N 2560/06* (2013.01); *F01N 2560/07* (2013.01); *F01N 2560/08* (2013.01); *F01N 2560/14* (2013.01); *Y02T 10/24* (2013.01); *Y02T 10/47* (2013.01)

(56) References Cited

U.S. PATENT DOCUMENTS

| | | | |
|---|---|---|---|
| 2010/0058738 A1* | 3/2010 | Webb | F01N 9/00 60/285 |
| 2011/0005199 A1* | 1/2011 | Kammer | F01N 3/0814 60/274 |
| 2012/0180458 A1 | 7/2012 | Nishijima | |
| 2012/0227377 A1* | 9/2012 | Hopka | F01N 11/00 60/274 |

FOREIGN PATENT DOCUMENTS

| | | |
|---|---|---|
| JP | 2006-125247 | 5/2006 |
| JP | 2010-229957 | 10/2010 |
| JP | 2010-248952 | 11/2010 |
| JP | 2010-275917 | 12/2010 |
| JP | 2011-241724 | 12/2011 |
| JP | 2012-31826 | 2/2012 |

* cited by examiner

EXHAUST GAS PURIFICATION APPARATUS FOR INTERNAL COMBUSTION ENGINE

TECHNICAL FIELD

The present invention relates to an exhaust gas purification apparatus for an internal combustion engine.

BACKGROUND ART

Patent document 1 describes an NOx selective reduction catalyst (which will be also referred to simply as "NOx catalyst" hereinafter) and a PM sensor provided downstream of a filter for trapping particulate matter (which will be sometimes referred to as "PM" hereinafter) in exhaust gas.

Patent document 2 describes that deposition of PM contained in exhaust gas on a catalyst deteriorates the catalytic effect.

Patent document 3 describes that when it is determined that a catalyst is in a poisoned condition, a determination as to the degree of deterioration of the catalyst is disabled, or outputting of a result of a determination as to the degree of deterioration of the catalyst is disabled.

Patent document 4 describes that adhesion of HC, SOF, and PM etc. to an exhaust gas purification catalyst leads to a deterioration (poisoning) of the purifying function.

Patent document 5 describes that since liquids such as condensed water have electrical conductivities higher than PM, whose main ingredient is carbon, a change in the capacitance caused by adhesion of condensed water to an electrode part of an PM sensor is significantly larger than a change in the capacity caused by adhesion of PM to the electrode part of the PM sensor.

Even if a filter is provided upstream of an NOx catalyst, a certain amount of PM passes through the filter, and consequently PM adheres to the NOx catalyst in some cases. For example, if the filter has a crack, a large amount of PM adheres to the NOx catalyst. If the surface of the NOx catalyst is covered with PM adhering to the NOx catalyst, the hydrolysis of urea is hindered. In consequence, urea passes through the NOx catalyst without being used to remove NOx in the NOx catalyst. If such urea adheres to the PM sensor, the urea affects the output value of the PM sensor, possibly leading to a deterioration in the accuracy of PM detection. In the case where a cover for protecting a PM sensor element is provided, if reducing agent adheres to the cover, PM is hard to reach the element, possibly leading to a deterioration in the accuracy of PM detection. Although a failure of the filter can be determined using the PM sensor, adhesion of urea to the PM sensor makes the determination of filter failure difficult.

PRIOR ART DOCUMENTS

Patent Documents

Patent Document 1: Japanese Patent Application Laid-Open No. 2010-229957
Patent Document 2: Japanese Patent Application Laid-Open No. 2002-136842
Patent Document 3: Japanese Patent Application Laid-Open No. 2010-248952
Patent Document 4: Japanese Patent Application Laid-Open No. 2000-008840
Patent Document 5: Japanese Patent Application Laid-Open No. 2010-275917

SUMMARY OF THE INVENTION

Problems to be Solved by the Invention

The present invention has been made in view of the above-described problems, and its object is to reduce the deterioration in the accuracy of determination as to a failure of a filter.

Means for Solving the Problems

To achieve the above object, an exhaust gas purification apparatus for an internal combustion engine according to the present invention comprises:
an NOx selective reduction catalyst provided in an exhaust passage of an internal combustion engine to reduce NOx by reducing agent supplied to it;
a supplying device that supplies urea to said NOx selective reduction catalyst from the upstream of said NOx selective reduction catalyst;
a filter provided in the exhaust passage upstream of said supplying device to trap particulate matter in exhaust gas;
a PM sensor that measures the amount of particulate matter in exhaust gas in the downstream of said NOx selective reduction catalyst; and
a disabling part that disables determination as to a failure of said filter using a measure value of said PM sensor when the amount of particulate matter adhering to said NOx selective reduction catalyst is equal to or larger than a threshold.

Urea supplied by the supplying device to the NOx catalyst is hydrolyzed in the NOx catalyst to become ammonia. This ammonia is used as reducing agent in the NOx catalyst. In other words, NOx is reduced by the presence of ammonia. The amount of particulate matter (PM) adhering to the NOx selective reduction catalyst can be estimated or measured based on, for example, the amount PM discharged from the internal combustion engine or the amount of PM measured by a sensor in the upstream of the NOx catalyst.

If a large amount PM adheres to the NOx catalyst when urea is supplied by the supplying device, hydrolysis of urea is hindered by the PM. A portion of the urea that is not hydrolyzed does not reduce NOx in the NOx catalyst and flows out downstream of the NOx catalyst. Urea sometimes passes through the NOx catalyst in this way to adhere to a PM sensor. If urea adheres to the PM sensor, values output from the PM sensor change, making accurate measurement of PM difficult.

A determination as to a failure of the filter can be made using a measurement value of the PM sensor. Since the PM measured by the PM sensor is the PM having passed through the filter, the larger the measurement value of the PM sensor is, the higher the degree of failure of the filter considered to be. For example, if the filter has a crack, the larger the area of the crack opening is, the larger the amount of PM passing through the filter is. The determination as to a failure of the filter may include a determination as to whether or not the filter is faulty and a determination as to the degree of failure of the filter.

When urea adheres to the PM sensor, the measurement value of the PM sensor changes due to the urea. When this is the case, making a determination as to a failure of the filter using a value measured by the PM sensor can lead to an erroneous determination. However, since the disabling part disables the determination as to a failure of the filter using the measurement value of the PM sensor, errors in determination as to a failure of the filter can be reduced.

The determination as to a failure of the filter may be made using other methods without using a measurement value of the PM sensor. The aforementioned threshold is an amount of PM that hinders hydrolysis of urea in the NOx catalyst. The threshold may be the amount of PM adhering to the NOx catalyst at which the amount of urea that passes through the NOx catalyst exceeds an allowable range.

The apparatus according to the present invention may further include a restriction part that restricts supply of urea by said supplying device when the amount of particulate matter adhering to said NOx selective reduction catalyst is equal to or larger than a threshold.

The restriction part restricts supply of urea when in a state in which urea passes through the NOx catalyst. Specifically, when the amount of particulate matter adhering to the NOx catalyst is equal to or larger than the threshold, the restriction part restricts supply of urea. The restriction of supply of urea may include disabling (suspending) supply of urea and reducing the quantity of supplied urea. By restricting supply of urea in this way, the amount of urea passing through the NOx catalyst can be decreased, and therefore the adhesion of urea to the PM sensor can be prevented. In consequence, a decrease in the accuracy of measurement by the PM sensor can be prevented.

The apparatus according to the present invention may include a removing part that removes particulate matter adhering to said NOx selective reduction catalyst when the amount of particulate matter adhering to said NOx selective reduction catalyst is equal to or larger than the threshold.

The PM adhering to the NOx catalyst can be removed by, for example, raising the temperature of the exhaust gas flowing into the NOx catalyst or heating the NOx catalyst. If PM is removed from the NOx catalyst, hydrolysis of urea is promoted, and therefore adhesion of urea to the PM sensor can be reduced.

In the apparatus according to the present invention, when an integrated value of the amount of particulate matter passing through said filter is equal to or larger than a predetermined value, the amount of particulate matter adhering to said NOx selective reduction catalyst may be equal to or larger than the threshold.

In the case where a filter is provided upstream of the NOx catalyst, PM is trapped by the filter. Consequently, so long as the filter is normal, the amount of PM adhering to the NOx catalyst is little. On the other hand, if a failure such as cracking occurs with the filter, PM passes through the filter and adheres to the NOx catalyst. Since the integrated value of the amount of PM passing through the filter and the amount of PM adhering to the NOx catalyst correlate with each other, the amount of PM adhering to the NOx catalyst can be estimated based on the integrated value of PM passing through the filter. Therefore, when the integrated value of the amount of PM passing through the filter is equal to or larger than a predetermined value, it may be concluded that the amount of PM adhering to the NOx catalyst is equal to or larger than the threshold. The predetermined value mentioned above is a value at which hydrolysis of urea in the NOx catalyst is hindered. The predetermined value may be a value at which the amount of urea passing through the NOx catalyst just exceeds an allowable range. The amount of PM passing through the filter may be determined based on an presumed degree of failure of the filter.

In the apparatus according to the present invention, when a measurement value of said PM sensor deviates from a presumed normal range by a margin equal to or larger than a predetermined value, the amount of particulate matter adhering to said NOx selective reduction catalyst may be equal to or larger than the threshold.

The measurement value of the PM sensor changes with the amount of PM discharged from the internal combustion engine. The amount of PM discharged from the internal combustion engine is determined in accordance with the operation state of the internal combustion engine. In the case where the apparatus has a filter, the measurement value of the PM sensor also changes with the amount of PM passing through the filter. If the PM sensor is normal, the measurement values of the PM sensor fall within a specific range. The presumed normal range is this specific range. On the other hand, when urea adheres to the PM sensor, the measurement value of the PM sensor changes due to effects of urea. Consequently, measurement values of the PM sensor deviate from the presumed normal range. If the deviation is equal to or larger than a predetermined value, it is considered that urea adheres to the PM sensor. In other words, it may be concluded that amount of PM adhering to the NOx catalyst is equal to or larger than the threshold. The predetermined value mentioned above may be the smallest absolute value of the difference between the presumed normal range of the measurement value of the PM sensor and the measurement values of the PM sensor in the state in which urea adheres to the PM sensor.

In the apparatus according to the present invention, said restriction part may estimate the amount of particulate matter passing through said filter on the assumption that the degree of failure of said filter is a predetermined degree.

Since the amount of PM passing through the filter changes in accordance with the degree of failure of the filter, the amount of PM adhering to the NOx catalyst also changes. In other words, the degree of failure of the filter and the amount of PM adhering to the NOx catalyst correlate with each other. Therefore, on the assumption that the degree of failure of the filter is a predetermined degree, the amount of particular matter adhering to the NOx catalyst can be estimated. The degree of failure of the filter may be the degree of decrease in the PM trapping rate, or the crack rate of the filter. The degree of failure of the filter may be a ratio of the amount of PM flowing out of the filter to the amount of PM flowing into the filter in a predetermined operation state. The predetermined value of the degree of failure of the filter may be specified arbitrary, but it may be determined in the following manner.

Specifically, the apparatus according to the present invention may be provided with a differential pressure sensor that measures difference between the pressure in the exhaust passage upstream of said filter and the pressure in the exhaust passage downstream of said filter, and the predetermined degree of failure of said filter may be the lowest degree of failure at which it is possible to determine that the filter is faulty by means of the differential pressure sensor.

If the predetermined degree of failure of the filter is too low, the amount of PM actually adhering to the NOx catalyst is larger than the estimated amount of PM adhering to the NOx catalyst in cases where the degree of failure of the filter is higher than assumed, as is the case, for example, when the filter is removed. Then, the PM sensor becomes abnormal before supply of urea is disabled. On the other hand, if the predetermined degree of failure of the filter is too high, supply of urea is disabled frequently, possibly leading to a decrease in the removal rate of NOx. Moreover, there is a possibility that the number of times of making a determination as to a failure of the filter may decrease.

When the degree of failure of the filter is low, as is the case when the filter is has a small crack, the measurement value of the differential pressure sensor is almost equal to that in the case where the filter is normal. Therefore, a failure of the filter can be determined by means of the differential pressure sensor only when the degree of failure of the filter is relatively high. On the other hand, when the degree of failure of the filter is relatively high, the accuracy of measurement by the PM sensor is deteriorated because the amount of urea adhering to the PM sensor is large.

If the predetermined value of failure of the filter is the lowest degree of failure at which it is possible to determine that the filter is faulty by means of the differential pressure sensor, supply of urea can be prevented from restricted frequently. On the other hand, in cases where the degree of failure of the filter is high, as is the case, for example, when the filter is removed, a determination as to a failure of the filter can be made using the differential pressure sensor.

As above, in the apparatus according to the present invention, when the degree of failure of said filter is equal to or higher than the predetermined degree, a determination as to a failure of said filter may be made based on a measurement value of said differential pressure sensor, and when the degree of failure of said filter is lower than the predetermined degree, a determination as to a failure of said filter may be made based on a measurement value of said PM sensor.

As described above, even when the PM sensor is in trouble, a determination as to a failure of the filter can be made by means of the differential pressure sensor. Therefore, a decrease in the accuracy of determination as to a failure of the filter can be prevented.

Advantageous Effect of the Invention

The present invention can prevent a decrease in the accuracy of determination as to a failure of a filter.

EMBODIMENTS FOR CARRYING OUT THE INVENTION

In the following, specific embodiments of the exhaust gas purification apparatus for an internal combustion engine according to the present invention will be described with reference to the drawings.

<Embodiment 1>

Figure 1:
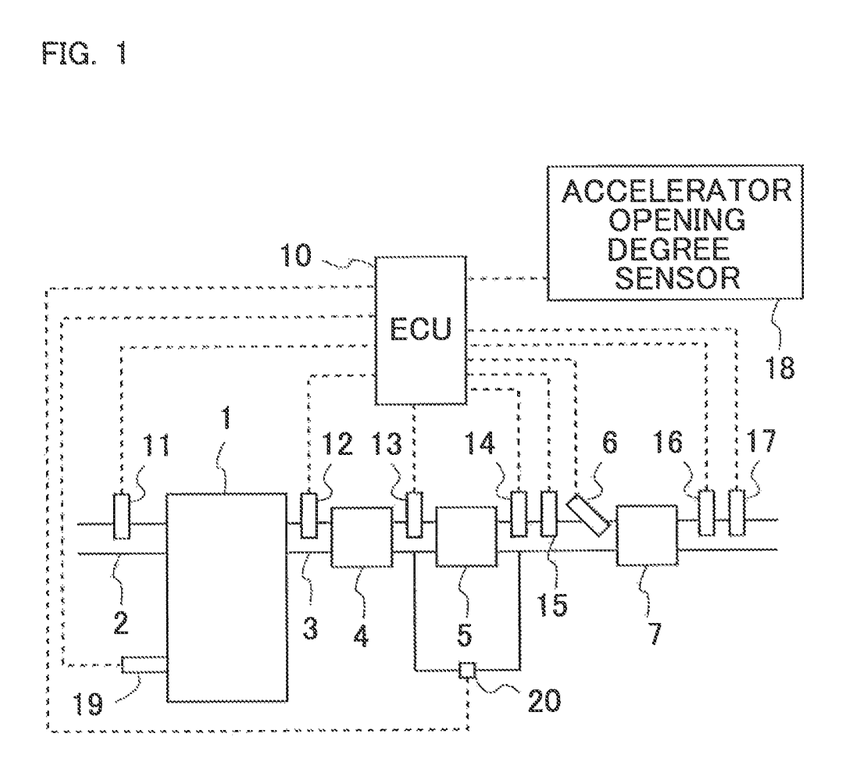
FIG. 1 is a diagram showing the general configuration of an exhaust gas purification apparatus for an internal combustion engine according to first and second embodiment.

FIG. 1 is a diagram showing the general configuration of an exhaust gas purification apparatus for an internal combustion engine according to the embodiment. The internal combustion engine 1 shown in FIG. 1 may be either a gasoline engine or a diesel engine.

The internal combustion engine 1 is connected with an intake passage 2 and an exhaust passage 3. The intake passage 2 is provided with an air flow meter 11 that measures the quantity of intake air flowing in the intake passage 2. On the other hand, the exhaust passage 3 is provided with, in order from the upstream of exhaust gas flow, an oxidation catalyst 4, a filter 5, an injection valve 6, an NOx selective reduction catalyst 7 (which will be hereinafter referred to as the NOx catalyst 7).

The oxidation catalyst 4 may be a catalyst having an oxidative effect. For example, it may be a three way catalyst. The oxidation catalyst 4 may be supported on the filter 5.

The filter 5 traps PM in the exhaust gas. The filter 5 may support a catalyst. As the filter 5 traps PM, PM is gradually deposited on the filter 5. The PM deposited on the filter 5 can be removed by oxidizing it by performing what is called a filter regeneration process, which is the processing of forcibly raising the temperature of the filter 5. For example, the temperature of the filter 5 can be raised by supplying HC to the oxidation catalyst 4. Alternatively, the oxidation catalyst 4 may be eliminated, and equipment for raising the temperature of the filter 5 may be provided. Still alternatively, the temperature of the filter 5 may be raised by discharging high temperature gas from the internal combustion engine 1.

The injection valve 6 injects aqueous urea solution. The aqueous urea solution injected through the injection valve 6 is hydrolyzed in the NOx catalyst 7 to become ammonia ($NH_3$), all or a portion of which adheres to the NOx catalyst 7. This ammonia is used as reducing agent in the NOx catalyst 7. In this embodiment, the injection valve 6 corresponds to the supplying device in the present invention. Alternatively, a device that supplies solid state urea instead of the injected aqueous urea solution may be employed.

The NOx catalyst 7 reduces NOx in the exhaust gas when reducing agent is present. Therefore, if ammonia is adsorbed to the NOx catalyst 7 beforehand, NOx can be reduced by ammonia in the NOx catalyst 7.

A first exhaust gas temperature sensor 12 that measures the temperature of the exhaust gas is provided in the exhaust passage 3 upstream of the oxidation catalyst 4. A second exhaust gas temperature sensor 13 that measures the temperature of the exhaust gas is provided in the exhaust passage 3 downstream of the oxidation catalyst 4 and upstream of the filter 5. A third exhaust gas temperature sensor 14 that measures the temperature of the exhaust gas and a first NOx sensor 15 that measures the NOx concentration in the exhaust gas are provided in the exhaust passage 3 downstream of the filter 5 and upstream of the injection valve 6. A second NOx sensor 16 that measures the NOx concentration in the exhaust gas and a PM sensor 17 that measures the amount of PM in the exhaust gas are provided in the exhaust passage 3 downstream of the NOx catalyst 7. Moreover, the exhaust passage 3 is provided with a differential pressure sensor 20 that measures the difference between the pressure in the exhaust passage 3 downstream of the oxidation catalyst 4 and upstream of the filter 5 and the pressure in the exhaust passage 3 downstream of the filter 5 and the upstream of the NOx catalyst 7. With the differential pressure sensor 20, the differential pressure across the filter 5 (which will be also referred to as the filter differential pressure hereinafter) can be measured. Not all of the above-described sensors are essential, but they may be provided as necessary.

The internal combustion engine 1 having the above-described construction is equipped with an ECU 10, which is an electronic control unit for controlling the internal combustion engine 1. The ECU 10 controls the internal combustion engine 1 in response to operation conditions of the internal combustion engine 1 and driver's requests.

The ECU 10 is connected through electrical wiring with an accelerator opening degree sensor 18 that outputs an electrical signal representing the amount of depression of the accelerator pedal to enable measurement of the engine load and a crank position sensor 19 that measures the engine speed. Signals output from these sensors are input to the ECU 10. Moreover, the ECU 10 is connected through electrical wiring with the injection valve 6, and the injection valve 6 is controlled by the ECU 10.

The ECU 10 executes the aforementioned filter regeneration process when the amount of PM deposited on the filter 5 reaches or exceeds a predetermined amount. The filter regeneration process may be performed when the travel distance of a vehicle equipped with the internal combustion engine 1 reaches or exceeds a predetermined distance. Alternatively, the filter regeneration process may be performed at regular intervals.

The ECU 10 makes a determination as to a failure of the filter 5 on the basis of the amount of PM measured by the PM sensor 17. When a failure of the filter 5 such as cracking occurs, the amount of PM passing through the filter 5 increases. By detecting this increase in the amount of PM by the PM sensor 17, a failure of the filter 5 can be determined.

For example, a determination as to a failure of the filter 5 is made by comparing the integrated value of the amount of PM over a predetermined period of time calculated based on the measurement value of the PM sensor 17 and the integrated value of the amount of PM over the predetermined period of time calculated on the assumption that the filter 5 is in a predetermined condition.

Figure 2:
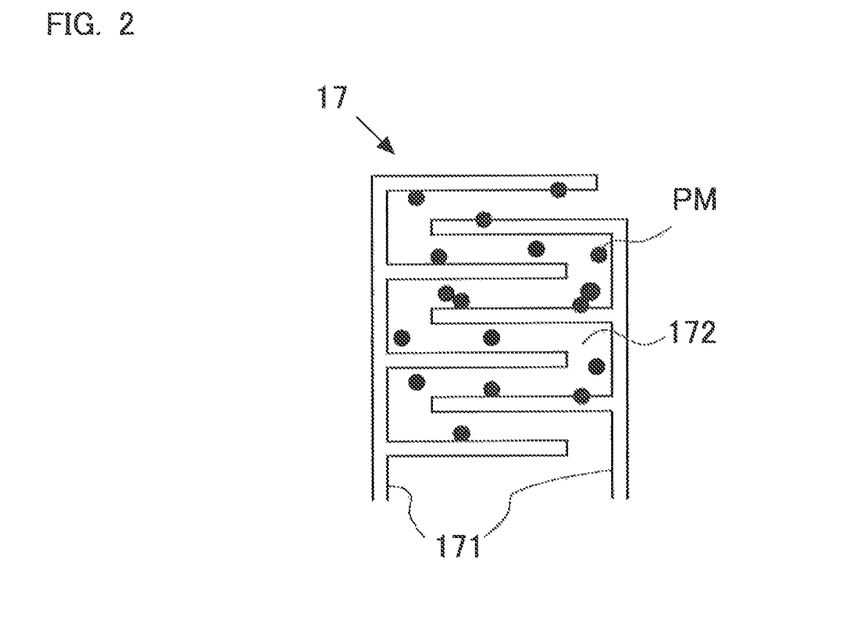
FIG. 2 is a schematic diagram showing the structure of a PM sensor.

FIG. 2 is a schematic diagram showing the structure of the PM sensor 17. The PM sensor 17 is a sensor that outputs an electrical signal representing the amount of PM deposited on itself. The PM sensor 17 has a pair of electrodes 171 and an insulator 172 arranged between the two electrodes 171. As PM adheres between the two electrodes 171, the electrical resistance between the two electrodes 171 changes. Because this change in the electrical resistance correlates with the amount of PM in the exhaust gas, the amount of PM in the exhaust gas can be measured based on the change in the electrical resistance. This amount of PM may be the mass of PM per unit time. Alternatively, it may be the mass of PM over a predetermined time. The structure of the PM sensor 17 is not limited to the one shown in FIG. 2. What is essential is that the PM sensor used be one which measures PM and whose measurement value is changed by effects of urea.

The PM sensor 17 is arranged downstream of the filter 5. This means that the PM adhering to the PM sensor 17 is the PM that has passed through the filter 5 without being trapped by the filter 5. Therefore, the amount of PM deposited in the PM sensor 17 correlates with the integrated value of the amount of PM having passed through the filter 5.

Figure 3:
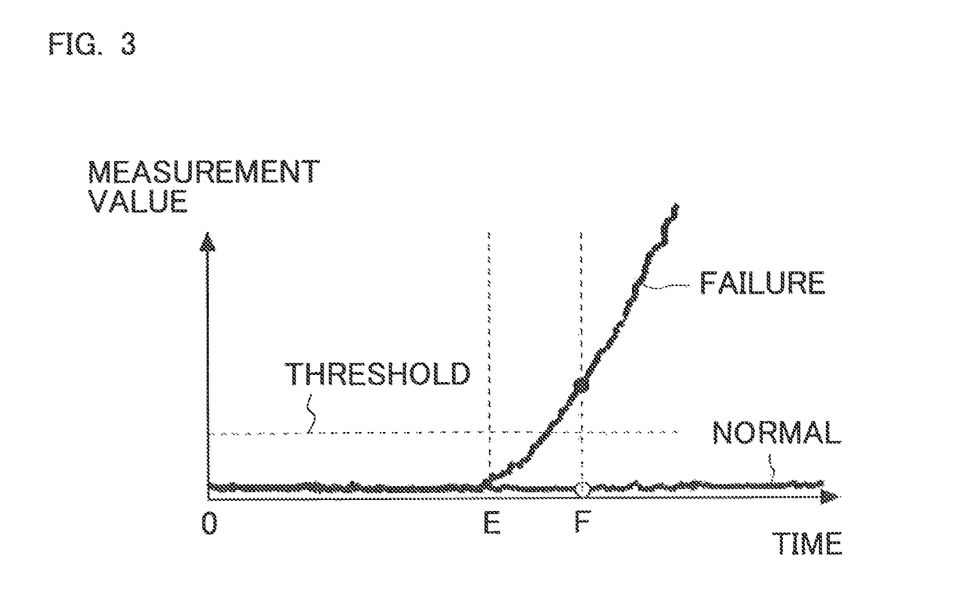
FIG. 3 is a time chart showing the change in the measurement value of the PM sensor over time in a case where a filter is normal and in a case where the filter is faulty.

FIG. 3 is a time chart showing the change in the measurement value of the PM sensor 17 over time in a case where the filter 5 is normal and in a case where the filter 5 is faulty. In the case where the filter 5 is faulty, PM is deposited on the PM sensor 17 faster, and accordingly the time E at which the measurement value starts to increase is earlier than that in the case where the filter 5 is normal. Therefore, if, for example, the measurement value at the time when the elapsed time from the start of the internal combustion engine 1 reaches a predetermined time F is equal to or larger than a threshold, it may be determined that the filter 5 is faulty. The predetermined time F is a period of time that does not make the measurement value of the PM sensor increase in the case where the filter 5 is normal and makes the measurement value of the PM sensor increase in the case where the filter 5 is faulty. The predetermined time F is determined based on, for example, experiments. The threshold is determined in advance as the smallest value of the measurement values of the PM sensor 17 in cases where the filter 5 is faulty, on the basis of, for example, experiments.

It might appear that the PM sensor 17 may be provided downstream of the filter 5 and upstream of the NOx catalyst 7. However, arranging the PM sensor 17 at such a location makes the distance from the filter 5 to the PM sensor 17 short. If this is the case, there is a possibility that PM having passed through a cracked portion of the filter 5 may reach the location around the PM sensor 17 without being diffused in the exhaust gas. Then, there may be cases, depending on the location of the crack on the filter 5, where PM hardly adheres to the PM sensor 17, and PM is not detected. This may lead to a deterioration in the accuracy of the failure determination.

In contrast to the above, in this embodiment, since the PM sensor 17 is arranged downstream of the NOx catalyst 7, the distance from the filter 5 to the PM sensor 17 is long. Therefore, PM having passed through the filter 5 has been diffused at the location around the PM sensor 17. Therefore, it is possible to detect PM irrespective of the location of the crack on the filter 5.

However, since the PM sensor 17 is provided downstream of the injection valve 6, there is a possibility that reducing agent (urea) injected through the injection valve 6 may adhere to the PM sensor 17. The adhesion of reducing agent to the PM sensor 17 can cause a change in the measurement value of the PM sensor 17. If PM adheres to the NOx catalyst 7, the hydrolysis of urea is hindered by the PM. A portion of urea that is not hydrolyzed flows out of the NOx catalyst 7 without reacting in the NOx catalyst 7. In other words, if the NOx catalyst 7 is covered with PM, urea passes through the NOx catalyst 7. If such urea adheres to the PM sensor 17, a change in the measurement value of the PM sensor 17 will result.

Figure 4:
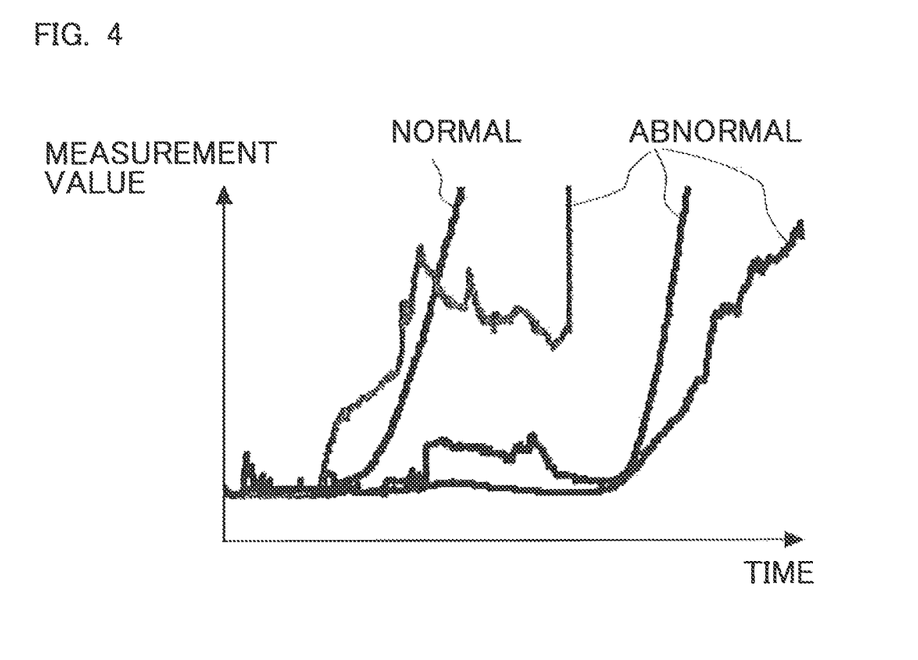
FIG. 4 is a time chart showing the change in the measurement value of the PM sensor over time in a case where it is normal and in a case where it is abnormal.

FIG. 4 is a time chart showing the change in the measurement value of the PM sensor 17 over time in a case where it is normal and in a case where it is abnormal. The case where the measurement value is abnormal is a case where reducing agent adheres to the PM sensor 17 to cause a change in the measurement value.

When normal, the measurement value increases with the lapse of time. Specifically, the measurement value increases with the amount of PM adhering to the PM sensor 17. On the other hand, when abnormal, the measurement value may not only increase but decrease in some cases. Moreover, when abnormal, it may take some time for the measurement value to start to increase in some cases. If urea adheres to the PM sensor 17 and the deposited amount thereof reaches or exceeds a predetermined amount, the measurement value of the PM sensor 17 increases in the same manner as in the case where PM is deposited on it. However, since urea evaporates at a temperature lower than PM. In consequence, the urea adhering to the PM sensor 17 evaporates when the temperature of the exhaust gas of the internal combustion engine 1 is high. Then, the deposited amount of urea decreases, leading to a decrease in the measurement value of the PM sensor 17. This phenomenon will not occur when only PM is deposited on the PM sensor 17.

If adhering urea is deposited on the cover of the PM sensor 17, holes provided on the cover may be stopped in some cases. If the holes are stopped, PM cannot reach the pair of electrodes 171, so that PM is not detected. Then, it takes some time for the measurement value to start to increase.

As described above, if urea passes through the NOx catalyst 7 because of the adhesion of PM to the NOx catalyst 7, the measurement value of the PM sensor 17 changes to make the determination as to a failure of the filter 5 difficult. In view of this, in this embodiment, the amount of PM adhering to the NOx catalyst 7 (which will also be referred to as the PM deposition amount hereinafter) is estimated or measured, and if the PM deposition amount reaches or exceeds a threshold, it is concluded that the urea passes through the NOx catalyst 7 because of the PM adhering to the NOx catalyst 7. The PM deposition amount correlates with the integrated value of the amount of PM passing through the filter 5 (which will also be referred to as the passing PM amount). Therefore, the passing PM amount is estimated or measured, and if the integrated value of the passing PM amount reaches or exceeds a predetermined value, it is concluded that the PM deposition amount is equal to or higher than the threshold.

Referring to FIG. 4, if the actual measurement value of the PM sensor 17 deviates from a presumed normal range by a margin equal to or larger than a predetermined value, it may be concluded that the amount of PM adhering to the NOx catalyst 7 is equal to or larger than the threshold. The presumed normal range may be determined based on the amount of PM discharged from the internal combustion engine 1. The predetermined value mentioned above may be set to be the smallest absolute value of the difference between the presumed normal range of the measurement value of the PM sensor 17 and the measurement values of the PM sensor 17 in the state in which urea adheres to the PM sensor 17. As seen from FIG. 4, when urea adheres to the PM sensor 17, the measurement value of the PM sensor 17 can decrease. Therefore, if the measurement value of the PM sensor 17 decreases, it may be concluded that the measurement value of the PM sensor 17 deviates from the presumed normal range by a margin equal to or larger than the predetermined value.

Moreover, when the PM deposition amount is equal to or larger than the threshold, the determination as to a failure of the filter 5 using the measurement value of the PM sensor 17 is disabled. Then, in addition, injection of aqueous urea solution through the injection valve 6 may be restricted. Alternatively, use of the measurement value of the PM sensor 17 may be disabled. The restriction of injection of aqueous urea solution through the injection valve 6 may include disabling injection of aqueous urea solution or reducing the quantity of injected aqueous urea solution. In the case where the PM deposition amount is equal to or larger than the threshold, if the amount of reducing agent adsorbed in the NOx catalyst 7 is large enough to allow removal of NOx, injection of aqueous urea solution through the injection valve 6 may be disabled. If the amount of reducing agent adsorbed in the NOx catalyst 7 is not large enough to allow removal of NOx, the determination as to a failure of the filter 5 may be disabled while enabling injection of aqueous urea solution through the injection valve 6.

The PM deposition amount increases in accordance with the integrated value of the passing PM amount. Therefore, it is assumed that the PM deposition amount exceeds an allowable range when the integrated value of the passing PM amount reaches a predetermined value. The allowable range of the PM deposition amount is determined in such a way that the amount of urea passing through the NOx catalyst 7 falls within an allowable range. The integrated value of the passing PM amount is estimated in the following way.

Firstly, the passing PM amount is estimated on the assumption that the filter 5 has a failure such as crack. The passing PM amount as such is calculated by multiplying the amount of PM discharged from the internal combustion engine 1, which can be determined based on the operation state of the internal combustion engine 1, by a predetermined value. The predetermined value mentioned above is a ratio of the amount of PM flowing out of the filter 5 to the amount of PM flowing into the filter 5 in a state in which the filter 5 is faulty. This ratio will be hereinafter referred to as the "passing rate".

The passing rate changes in accordance with the size of the crack of the filter 5 or the degree of cracking (which will be hereinafter referred to as the crack rate) of the filter 5. The crack rate is a value representing the degree of failure of the filter 5 and can be determined based on the PM trapping efficiency. For example, when the filter 5 is in a brand new condition, the crack rate is 0%, and when the filter 5 cannot trap PM at all, the crack rate is 100%. Moreover, when the filter 5 is removed, the crack rate may be assumed to be 100%.

In this embodiment, the passing PM amount is specified on the assumption that the filter 5 has a predetermined crack rate. The passing PM amount is calculated by multiplying the amount of PM discharged from the internal combustion engine 1 by the passing rate. Since the amount of PM discharged from the internal combustion engine 1 correlates with the engine speed and the fuel injection quantity, the relationship between them is determined by, for example, experiments and prepared in advance as a map. The amount of PM discharged from the internal combustion engine 1 is calculated from the engine speed and the fuel injection quantity using this map.

The passing rate changes in conjunction with the filter differential pressure or the quantity of exhaust gas flowing into the filter 5. Therefore, the relationship between the passing rate and the filter differential pressure or the relationship between the passing rate and the quantity of exhaust gas flowing into the filter 5 is determined by, for example, experiments and prepared in advance as a map, which is stored in the ECU 10. For example, when the crack rate of the filter 5 is somewhat large, the higher the filter differential pressure is, the larger the passing rate is. The quantity of exhaust gas can be calculated based on the intake air quantity of the internal combustion engine 1 and the quantity of fuel supplied to the internal combustion engine 1. The integrated value of the passing PM amount can be obtained by calculating the passing PM amount per a predetermined time repeatedly and adding up the results.

Figure 5:
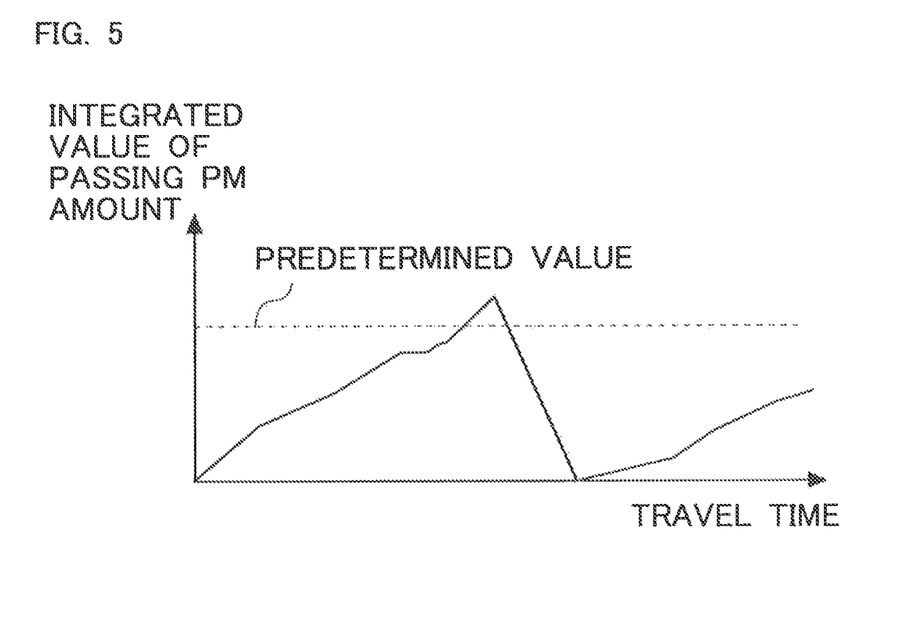
FIG. 5 is a graph showing a relationship between the travel time of a vehicle equipped with the internal combustion engine and the integrated value of the amount of PM passing through the filter (the passing PM amount).

FIG. 5 is a graph showing a relationship between the travel time of the vehicle equipped with the internal combustion engine 1 and the integrated value of the amount of PM passing through the filter 5 (the passing PM amount). The travel time of the vehicle may be replaced by the travel distance of the vehicle. The integrated value of the passing PM amount correlates with the amount of PM adhering to the NOx catalyst 7. The relationship between them can be determined in advance by, for example, experiments. When the integrated value of the passing PM amount reaches or exceeds the predetermined value, the amount of PM adhering to the NOx catalyst 7 reaches or exceeds the threshold. Then, processing for removing the PM adhering to the NOx catalyst 7 is carried out. For example, a heater may be attached to the NOx catalyst 7, and PM may be removed by raising the temperature of the NOx catalyst 7. Alternatively, the temperature of the exhaust gas flowing into the NOx catalyst 7 may be raised, as is the case with the regeneration process for the filter 5. Still alternatively, the temperature of the exhaust gas flowing into the NOx catalyst 7 may be raised by performing the regeneration process for the filter 5. As the PM adhering to the NOx catalyst 7 is removed, the integrated value of the passing PM amount decreases to zero. In this embodiment, the ECU 10 that executes the process of removing PM from the NOx catalyst 7 corresponds to the removing part in the present invention.

When the integrated value of the passing PM amount is larger than the predetermined value, and when the process of removing PM from the NOx catalyst 7 is performed, the determination as to a failure of the filter 5 using the measurement value of the PM sensor 17 is disabled Moreover, the quantity of supplied urea is restricted, or use of the measurement value of the PM sensor 17 is disabled.

Figure 6:
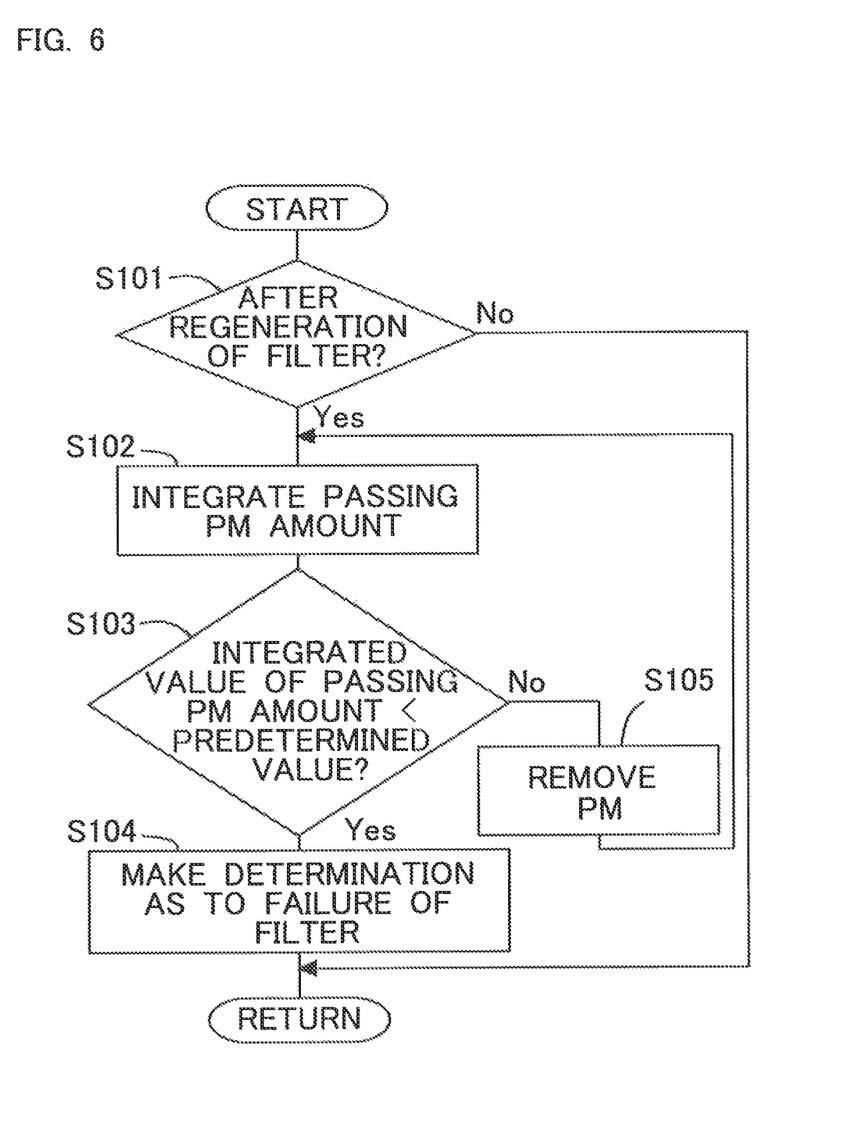
FIG. 6 is a flow chart of the process of determination as to a failure of the filter in the first embodiment.

FIG. 6 is a flow chart of the process of determination as to a failure of the filter 5 in this embodiment. This routine is executed at regular intervals by the ECU 10.

In step S101, it is determined whether or not the regeneration process for the filter 5 has been performed.

Performing the regeneration process for the filter 5 removes PM adhering to the NOx catalyst 7 and urea adhering to the PM sensor 17. In other words, this process makes the integrated value of the passing PM amount equal to zero. This condition is a precondition.

If the determination made in step S101 is affirmative, the process proceeds to step S102. On the other hand, if the determination is negative, this routine is terminated, because the precondition is not met.

In step S102, the passing PM amount is integrated. The passing PM amount is calculated as a value correlating with the amount of PM adhering to the NOx catalyst 7 (i.e. the PM deposition amount). The passing PM amount is calculated by multiplying the amount of PM discharged from the internal combustion engine 1 by the passing rate. The integrated value of the passing PM amount is obtained by calculating the passing PM amount per a predetermined time repeatedly and adding up the results. After the completion of the processing of step S102, the process proceeds to step S103.

In step S103, it is determined whether or not the integrated value of the passing PM amount is smaller than a predetermined value. This predetermined value is determined in advance as the smallest integrated value of such a passing PM amount that prevents hydrolysis of urea by, for example, experiments. In other words, what is determined in this step is whether or not hydrolysis of urea normally proceeds in the NOx catalyst 7. If the determination made in step S103 is affirmative, the process proceeds to step S104. On the other hand, if the determination is negative, the process proceeds to step S105.

In step S104, a determination as to a failure of the filter 5 is made using the PM sensor 17. At this time, supply of urea is enabled. After the completion of the processing of step S104, this routine is terminated.

In step S105, processing for removing the PM adhering to the NOx catalyst 7 is executed. For example, HC is supplied to the oxidation catalyst 4 to raise the temperature of the exhaust gas flowing into the NOx catalyst 7, thereby oxidizing the PM. At this time, detection of failure of the filter 5 is disabled, and supply of urea through the injection valve 6 is restricted. After the completion of the processing of step S105, the process returns to step S102. In this embodiment, the ECU 10 that executes the processing of step S105 corresponds the restriction part or the disabling part in the present invention.

As described above, in this embodiment, when there is a possibility that the accuracy of the measurement value of the PM sensor 17 is decreased by urea passing through the NOx catalyst 7, it is possible to restrict supply of urea, disable the determination as to a failure of the filter 5 using the measurement value of the PM sensor 17, and/or disable use of the measurement value of the PM sensor 17. In consequence, a decrease in the accuracy of measurement by the PM sensor 17 can be prevented, or an erroneous determination can be prevented from being made in the determination as to a failure of the filter 5. In other words, the accuracy of the determination as to a failure of the filter 5 can be prevented from being deteriorated.

This embodiment can also be applied to the case where the system does not have a filter 5. In the case where the system does not have a filter 5, the passing PM amount may be considered to be equal to the amount of PM discharged from the internal combustion engine 1. Alternatively, the passing rate and the crack rate may be considered to be equal to 100%.

<Embodiment 2>

This embodiment employs a method of specifying the passing rate different from the method employed in the first embodiment. Moreover, the differential pressure sensor 20 is additionally used in the determination as to a failure of the filter 5. The other features such as the apparatus used are the same as those in the first embodiment and will not be described accordingly.

In this embodiment, the passing rate or the passing PM amount is specified on the assumption that the degree of failure (crack rate) of the filter 5 is the lowest degree of failure (crack rate) at which it is possible to determine that the filter 5 is faulty by means of the differential pressure sensor 20. When the crack rate is low, the change in the differential pressure is small, and therefore, the crack of the filter 5 cannot be detected by means of the differential pressure sensor 20. If the passing rate is specified on the assumption that the crack rate of the filter 5 is at the boundary between an allowable range and an unallowable range, the actual passing rate is higher than the estimated passing rate in cases where the a large amount of PM reaches the NOx catalyst 7 and the PM sensor 17, as is the case, for example, when the filter 5 is removed by a user. Then, the measurement value of the PM sensor 17 becomes abnormal before the determination as to a failure of the filter 5 is disabled. This can lead to a deterioration in the accuracy of the determination as to a failure of the filter 5.

Figure 7:
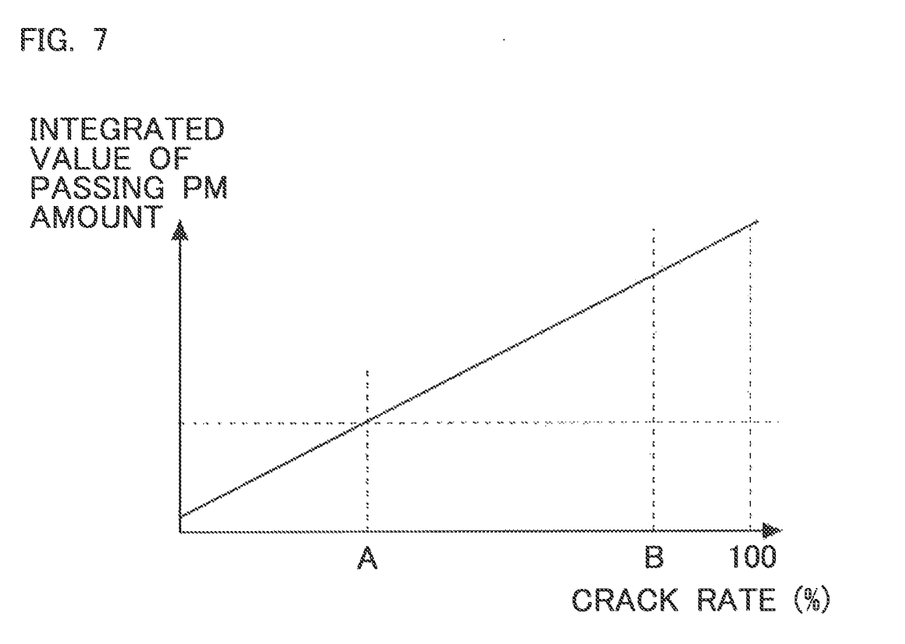
FIG. 7 is a graph showing the relationship between the degree of failure (crack rate) of the filter and the integrated value of the passing PM amount over a predetermined time of travel of the vehicle equipped with the internal combustion engine.

On the other hand, if the passing rate is specified taking the removal of the filter 5 etc. into consideration, the passing PM amount is estimated to be large. Then, the integrated value of the estimated passing PM amount reaches the predetermined amount frequently, and therefore supply of urea is restricted frequently. Supply of urea is restricted when the integrated value of the passing PM the filter 5 is faulty be made. The crack rate of the filter 5 indicated as B is the lowest crack rate at which it is possible to determine that the filter 5 is faulty by means of differential pressure sensor 20.

When the actual crack rate of the filter 5 is equal to or higher than A and lower than B, although the filter 5 is faulty, it is not possible to determine that the filter 5 is faulty by means of the differential pressure sensor 20. Therefore, when the crack rate of the filter 5 is equal to or higher than A and lower than B, a determination as to a failure of the filter 5 is made using the measurement value of the PM sensor 17. On the other hand, when the crack rate of the filter 5 is equal to or higher than B, the integrated value of the actual passing PM amount is larger than the integrated value of the estimated passing PM amount. Consequently, there is a possibility that the measurement value of the PM sensor 7 may be abnormal. In this case, the accuracy of the failure determination can be improved by making a determination as to a failure of the filter 5 using the differential pressure sensor 20 instead of the PM sensor 17.

As above, since the estimated value of the passing PM amount is smaller than that in the case where the passing rate is specified taking removal of filter 5 etc. into consideration, supply of urea can be prevented from being restricted frequently. In addition, the determination as to a failure of the filter 5 can be prevented from being disabled frequently. Moreover, the measurement value of the PM sensor 17 is less liable to become abnormal due to adhesion of a large amount of urea to the PM sensor 17. Furthermore, if a crack larger than expected such as removal of the filter 5 occurs, the failure of the filter 5 can be determined by means of the differential pressure sensor 20.

As above, if the passing rate is specified on the assumption that the degree of failure of the filter 5 is the lowest degree of failure at which it is possible to determine that the filter 5 is faulty by means of the differential pressure sensor 20, a failure of the filter 5 can be determined by means of the differential pressure sensor 20 even if the actual passing rate is higher than the passing rate as specified. Specifically, if the crack rate of the filter 5 is so large that it is possible to determine that the filter 5 is faulty by means of the differential pressure sensor 20, the actual passing PM amount is larger than the estimated passing PM amount, and consequently the amount of PM adhering to the NOx catalyst is larger than estimated. In consequence, urea passes through the NOx catalyst 7 to adhere to the PM sensor 17, thereby deteriorating the accuracy of measurement by the PM sensor 17. Even in this case, the failure of the filter 5 can be determined by means of the differential pressure sensor 20 because the crack rate is high.

If the actual crack rate is lower than the lowest crack rate at which it is possible to determine that the filter 5 is faulty by means of differential pressure sensor 20, the actual passing PM amount is smaller than the estimated passing PM amount. Consequently, the integrated value of the actual passing PM amount reaches the predetermined value after the integrated value of the estimated passing PM amount reaches the predetermined value. Moreover, since the process of removing the PM adhering to the NOx catalyst 7 is performed at the time when the integrated value of the estimated passing PM amount reaches the predetermined value, the PM adhering to the NOx catalyst 7 is removed before the actual passing PM amount reaches the predetermined value. In other words, PM can be removed from the NOx catalyst 7 before the measurement value of the PM sensor 17 becomes abnormal due to hindrance of hydrolysis of urea by effects of PM adhering to the NOx catalyst 7. In consequence, the accuracy of the determination as to a failure of the filter 5 can be improved.

Furthermore, when the integrated value of the estimated passing PM amount is equal to or larger than the predetermined value, supply of urea is restricted. Consequently, the passing of urea through the NOx catalyst 7 can be controlled, and therefore the adhesion of urea to the PM sensor 17 can be controlled. In consequence, the accuracy of the determination as to a failure of the filter 5 can be improved.

Moreover, the determination as to a failure of the filter 5 that is made using the PM sensor 17 may be disabled when the integrated value of the estimated passing PM amount is equal to or larger than the predetermined value. This can prevent an erroneous determination from being made. The determination as to a failure of the filter 5 may be disabled when the integrated value of the estimated passing PM amount is equal to or larger than the predetermined value. This can prevent an erroneous determination from being made.

Figure 8:
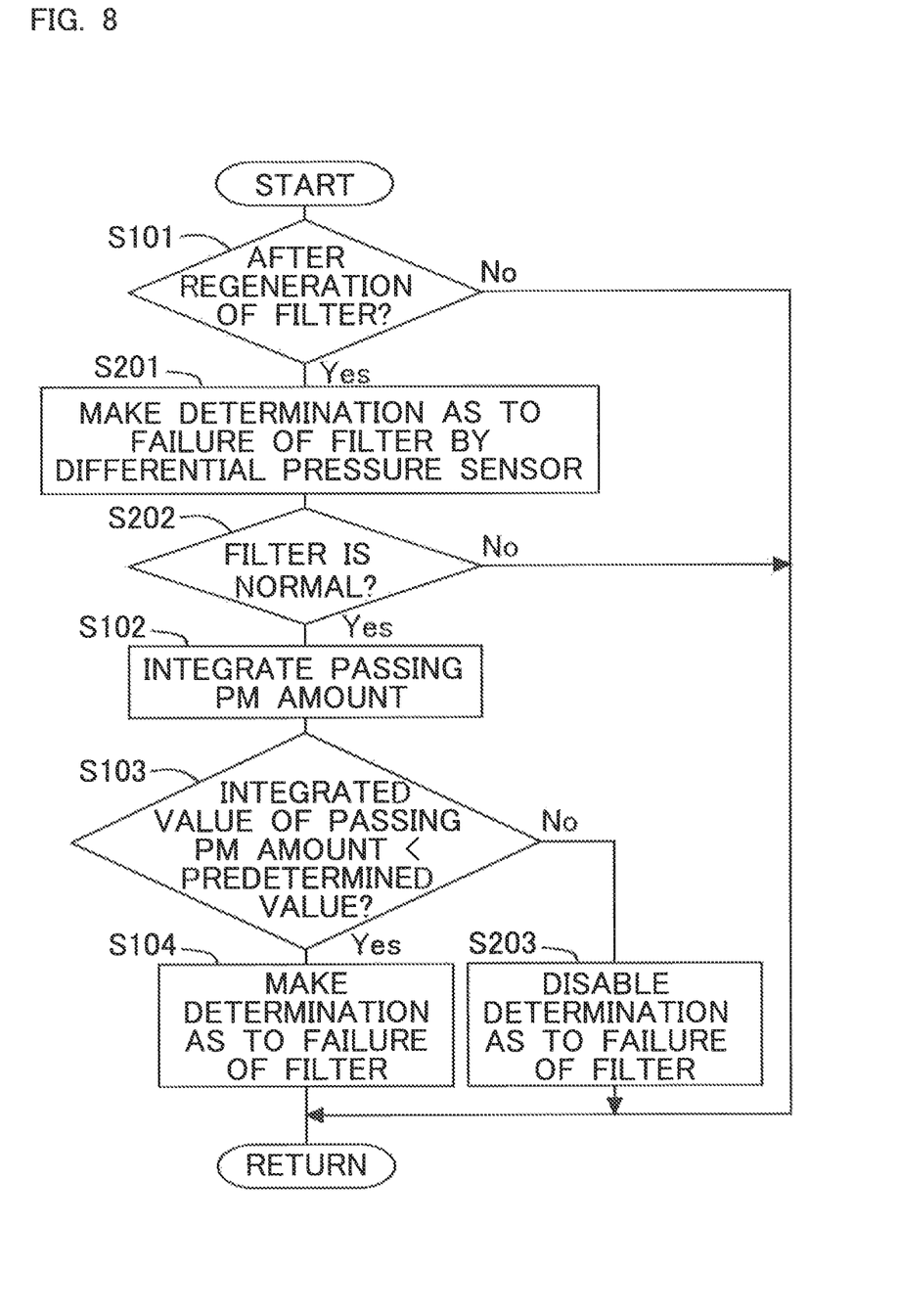
FIG. 8 is a flow chart of the process of determination as to a failure of the filter in the second embodiment.

FIG. 8 is a flow chart of the process of determination as to a failure of the filter 5 in this embodiment. This routine is executed at regular intervals by the ECU 10. The steps in which processing the same as that in the flow chart of FIG. 6 is executed are denoted by the same step numbers and will not be described further.

If the determination made in step S101 is affirmative, the process proceeds to step S201. In step S201, a determination as to a failure of the filter 5 is made using the differential pressure sensor 20. In this step, a determination as to a failure of the filter 5 is made using the differential pressure sensor 20. In the case where the differential pressure sensor 20 is used, a failure of the filter 5 cannot be determined unless the crack rate of the filter 5 is relatively high. Therefore, what is determined in this step is whether or not the filter 5 has a relatively large crack. In this step, the situation in which the filter 5 has been removed is also determined as a failure of the filter 5. After the completion of the processing of step S201, the process proceeds to step S202.

In step S202, it is determined whether or not the filter 5 is normal. In other words, it is determined whether or not it has been concluded that the filter 5 is normal in step S201. When the crack rate of the filter 5 is relatively low, it is determined in step S201 that the filter 5 is normal. Therefore, a determination as to a failure of the filter 5 using the measurement value of the PM sensor 17 is executed in a later step. If the determination made in step S202 is affirmative, the process proceeds to step S102. On the other hand, if the determination is negative, which means that it is determined that the filter 5 is faulty, this routine is terminated.

If the determination made in step S103 is negative, the process proceeds to step S203. In step S203, the execution of the determination as to a failure of the filter 5 using the PM sensor 17 is disabled. Alternatively, use of the measurement value of the PM sensor 17 may be disabled. Moreover, supply of urea through the injection valve 6 is restricted. In this case, the determination as to a failure of the filter 5 using the differential pressure sensor 20 has already been made in steps S201 and S202. Therefore, even if the filter 5 is faulty, its crack rate is low. Then, if PM is removed from the NOx catalyst 7, urea may be supplied and the determination as to a failure of the filter 5 using the PM sensor 17 may be made. For example, after the regeneration process for the filter 5 is carried out, supply of urea may be enabled, or the determination as to a failure of the filter 5 using the PM sensor 17 may be enabled. Moreover, removal of PM may be carried out in the same manner as step S105. In this embodiment, the ECU 10 that executes the processing of step S203 corresponds to the restriction part or the disabling part in the present invention.

As described in the foregoing, in this embodiment, a determination as to a failure of the filter 5 can be made selectively using the differential pressure sensor 20 and the PM sensor 17. Furthermore, the passing rate is specified on the assumption that the degree of failure (crack rate) of the filter 5 is the lowest degree of failure (crack rate) at which it is possible to determine that the filter 5 is faulty by means of the differential pressure sensor 20. This can prevent supply of urea from being restricted frequently or prevent the determination as to a failure of the filter 5 from being disabled frequently. Furthermore, the determination as to a failure of the filter 5 can be prevented from being performed in a state in which PM sensor 17 is abnormal.

DESCRIPTION OF THE REFERENCE SIGNS

1: internal combustion engine
2: intake passage
3: exhaust passage
4: oxidation catalyst
5: filter
6: injection valve
7: NOx selective reduction catalyst
10: ECU
11: air flow meter
12: first exhaust gas temperature sensor
13: second exhaust gas temperature sensor
14: third exhaust gas temperature sensor
15: first NOx sensor
16: second NOx sensor
17: PM sensor
18: accelerator opening degree sensor
19: crank position sensor
20: differential pressure sensor

The invention claimed is:

1. An exhaust gas purification apparatus for an internal combustion engine comprising:
   an NOx selective reduction catalyst provided in an exhaust passage of an internal combustion engine to reduce NOx by reducing agent supplied to it;
   a supplying device that supplies urea to said NOx selective reduction catalyst from the upstream of said NOx selective reduction catalyst;
   a filter provided in the exhaust passage upstream of said supplying device to trap particulate matter in exhaust gas;
   a PM sensor that measures the amount of particulate matter in exhaust gas in the downstream of said NOx selective reduction catalyst; and
   a controller configured to disable a determination as to a failure of said filter using a measurement value of said PM sensor when the amount of particulate matter adhering to said NOx selective reduction catalyst is equal to or larger than a threshold.

2. An exhaust gas purification apparatus for an internal combustion engine according to claim 1, wherein said controller is further configured to restrict a supply of urea by said supplying device when the amount of particulate matter adhering to said NOx selective reduction catalyst is equal to or larger than a threshold.

3. An exhaust gas purification apparatus for an internal combustion engine according to claim 1, wherein said controller is further configured to remove particulate matter adhering to said NOx selective reduction catalyst when the amount of particulate matter adhering to said NOx selective reduction catalyst is equal to or larger than the threshold.

4. An exhaust gas purification apparatus for an internal combustion engine according to claim 1, wherein the controller is configured to determine that the amount of particulate matter adhering to said NOx selective reduction catalyst is equal to or larger than the threshold, when an integrated value of the amount of particulate matter passing through said filter is equal to or larger than a predetermined value.

5. An exhaust gas purification apparatus for an internal combustion engine according to claim 4, wherein said controller is further configured to estimate the amount of particulate matter passing through said filter on the assumption that the degree of failure of said filter is a predetermined degree.

6. An exhaust gas purification apparatus for an internal combustion engine according to claim 5, comprising:
   a differential pressure sensor that measures difference between the pressure in the exhaust passage upstream of said filter and the pressure in the exhaust passage downstream of said filter,
   wherein the controller is configured to determine that the predetermined degree of failure of said filter is the lowest degree of failure at which it is possible to determine that the filter is faulty by means of the differential pressure sensor.

7. An exhaust gas purification apparatus for an internal combustion engine according to claim 6, wherein
   when the degree of failure of said filter is equal to or higher than the predetermined degree, the controller is configured to make a determination as to a failure of said filter based on a measurement value of said differential pressure sensor, and
   when the degree of failure of said filter is lower than the predetermined degree, the controller is configured to make a determination as to a failure of said filter based on a measurement value of said PM sensor.

8. An exhaust gas purification apparatus for an internal combustion engine according to claim 1, wherein the controller is configured to determined that the amount of particular matter adhering to said NOx selective reduction catalyst is equal to or larger than the threshold, when a measurement value of said PM sensor deviates from a presumed normal range by a margin equal to or larger than a predetermined value.

* * * * *